June 24, 1958 D. D. DEMAREST ET AL 2,839,780
APPARATUS FOR SKINNING FRANKFURTERS
Filed May 24, 1954 3 Sheets-Sheet 1
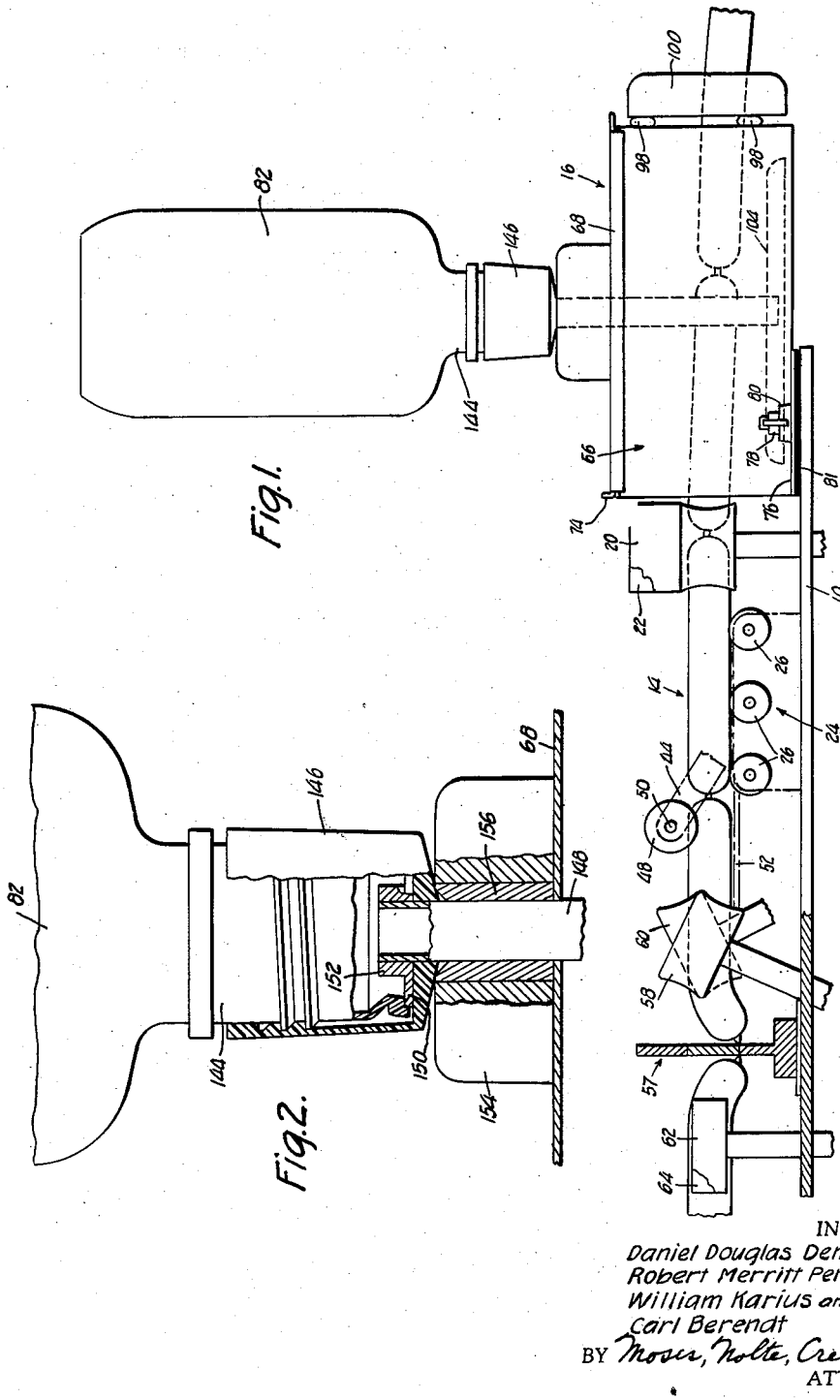
INVENTOR.
Daniel Douglas Demarest,
Robert Merritt Perkins,
William Karius and
Carl Berendt
BY
ATTORNEYS

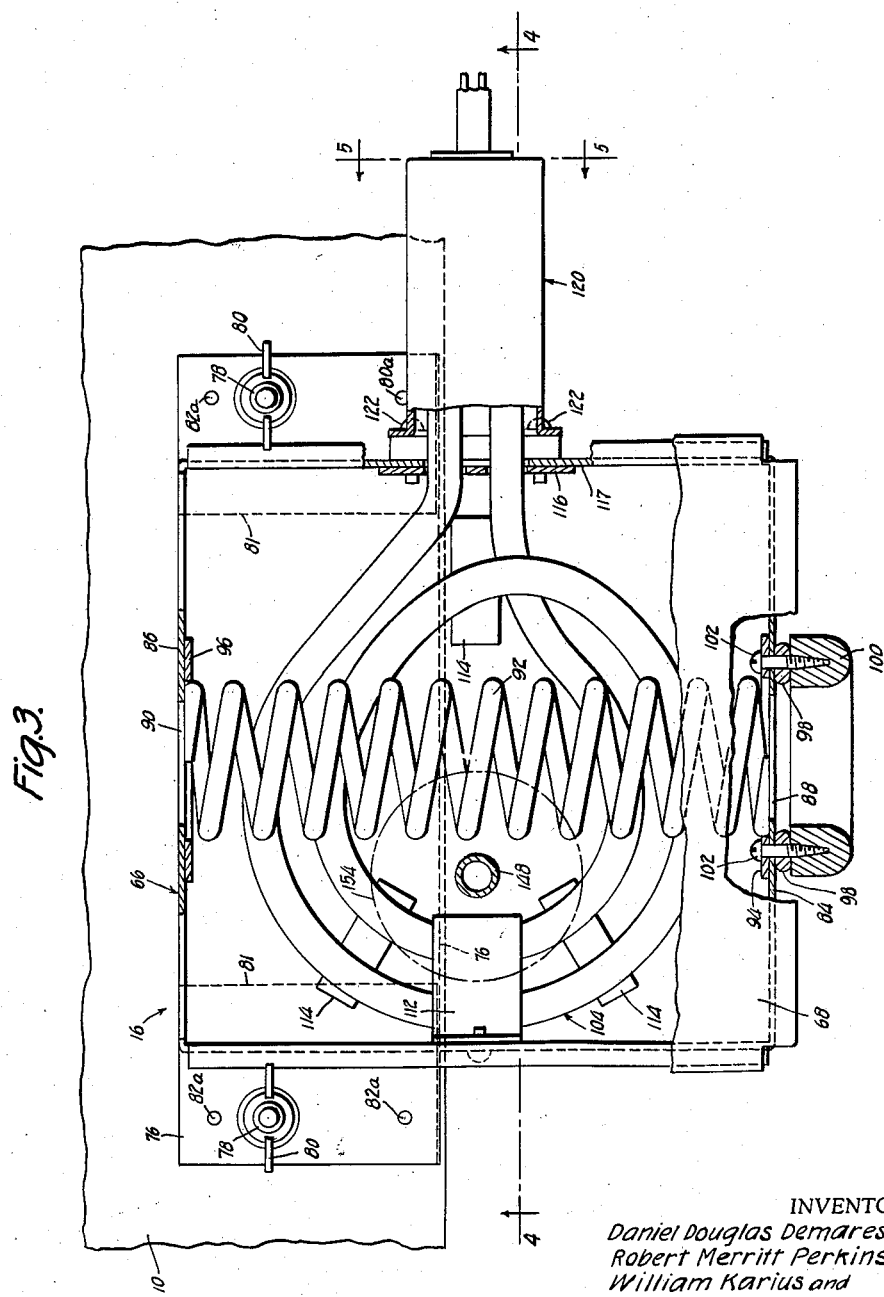

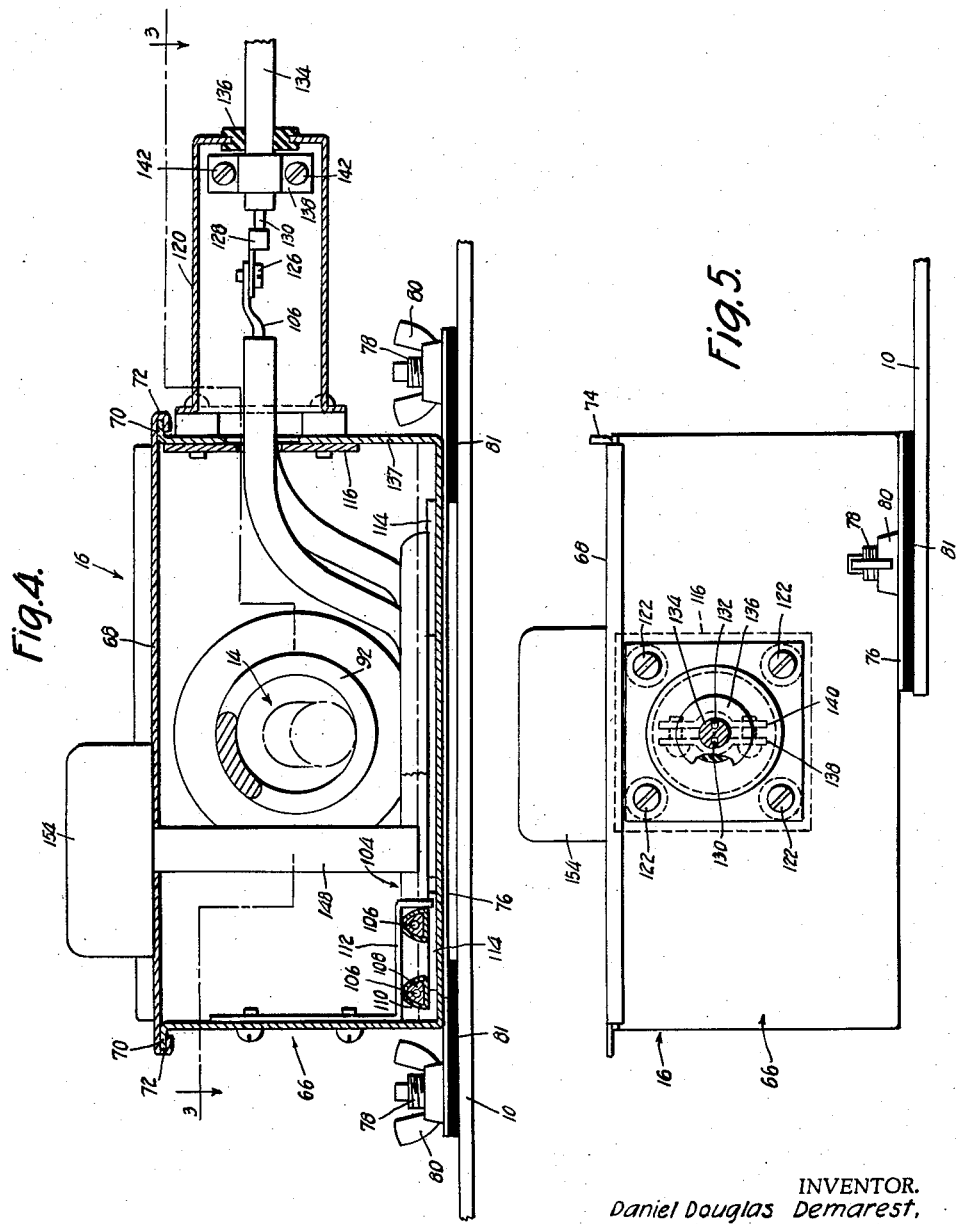

United States Patent Office 2,839,780
Patented June 24, 1958

2,839,780

APPARATUS FOR SKINNING FRANKFURTERS

Daniel Douglas Demarest, Port Washington, Robert Merritt Perkins, Upper Montclair, William Karius, Union, and Carl Berendt, Millburn, N. J., assignors to Linker Machines, Inc., Newark, N. J., a corporation of New York Application May 24, 1954, Serial No. 431,835

6 Claims. (Cl. 17—1)

This invention relates to a method and means for skinning frankfurters, and is in the nature of an improvement upon machines of the Linker type. While the invention is not confined to frankfurter skinning machines of the Linker type, it will be illustratively disclosed and described herein as incorporated in such a machine.

In the preparation of skinless frankfurters a long tube of cellophane is filled with ground meat and the links are tied off with string at intervals, providing ligatures substantially free of meat, through which successive links are connected to one another. The stuffed tube is then boiled in water to cook the meat, after which the string of frankfurters is kept under refrigeration preparatory to peeling.

It has been found that if the refrigerated frankfurters are put directly into the peeling machine the action of the peelers is apt to be erratic and inconsistent. If, however, the skin is steamed briefly, preliminary to peeling, the action of the peeler is fully efficient and dependable.

It is important that the temperature of the refrigerated meat, itself, be not substantially raised, for refrigerated meats which have been warmed to above 50° F. are not approved by the Bureau of Animal Industry inspectors.

It is accordingly an object of the invention to provide means for steaming the casings of the frankfurters en route to the peeling mechanism without substantially raising the temperature of the meat contained within the casings.

The treatment should be quick and brief, and can best be accomplished by steam. The treating means, therefore, is desirably made to consist of a steam box which forms a unitary part of the peeling machine and through which the frankfurters are caused to pass on their way to the peeling mechanism. The steam strikes all parts of the frankfurter casing equally, causing the beneficial action of the heat and moisture to be applied impartially.

It is important that the peeling machine in its entirety be made portable, so that it may be rolled away to be cleaned. It is a feature, therefore, that the steam box is made to carry its own water reservoir and to include means for generating its own steam as required, so that steam and/or water supply pipes, which would interfere with portability, are unnecessary.

It is also an important point from the standpoint of portability that there is no dripping of water from the steam box. Any steam which is condensed against the cold frankfurters falls back into the box and is automatically re-evaporated. The importance of this lies in the fact that any regular flow of water, even a small steady drip, must, for sanitary reasons, be piped to a sewer, and regulations of the Bureau of Animal Industry require that that be done.

It is a further feature that the steam box itself is so mounted and constructed that it can be readily removed and opened for cleaning. Capacity for frequent and thorough cleaning is an essential in all meat packing equipment, but it is especially important in this case because the heat of the steam and water affect the small particles of meat and fat which fall from the outside of the frankfurter casings and remain in the steam box. An accumulation of this material would quickly become rancid, and would lead to foul conditions and to the forbidding of the operation of the machine in inspected plants.

It is an object of the invention to provide a novel and efficient method of skinning frankfurters, which method comprises feeding a string of frankfurters longitudinally, subjecting the frankfurters one after another to a brief steaming treatment as they are being fed, and peeling each frankfurter promptly after the steaming treatment is completed.

Other objects and advantages will hereinafter appear.

In the drawing forming part of this specification:

Figure 1 is a fragmentary view in side elevation, partly in section with parts broken away, of a portable peeling machine embodying features of the present invention;

Figure 2 is a fragmentary detail view enlarged with respect to Fig. 1, partly in section and partly broken away, showing a water jar used in connection with the steam box and a support therefor;

Figure 3 is a fragmentary sectional view with parts broken away taken upon the line 3—3 of Fig. 4, looking in the direction of the arrows;

Figure 4 is a fragmentary sectional view taken upon the line 4—4 of Fig. 3, looking in the direction of the arrows; and Figure 5 is a sectional view with parts broken away taken upon the line 5—5 of Figure 3, looking in the direction of the arrows.

The illustrative, portable machine comprises a fixed base plate or table 10 which is supported at a convenient height above the floor by suitable frame members, not shown. The string of frankfurters or sausages 14 is introduced into the machine through a heating unit 16 (Fig. 1) which is supported from the table 10. The frankfurter string passes thence between feed rollers 20 and 22 and onto a roller table 24 which comprises a series of rollers 26 supported from the table 10.

Pivoted arms 44 support a hold-down roller 48 through bearing screws 50. A flanged plate 52 supports the frankfurters in opposition to the roller 48. The roller 48 is intended only as a hold-down roller and is not required to drop down into the spaces between successive links. From the plate 52 the frankfurters are advanced at constant speed to a ripperhead 57 by opposed, oppositely inclined, concave feed rollers 58 and 60 (Fig. 1).

The construction and operation of the ripperhead are fully disclosed and described in U. S. Patent No. 2,672,649 and no detailed showing and description are included herein.

At the ripperhead the leading frankfurter is severed from the remainder of the string 14 and from that point on each severed frankfurter is individually advanced by opposed feed rollers 62 and 64 to peeling mechanism (not shown) which peels the casing helically. The rollers 62, 64 are driven at slightly higher speed than the rollers 20, 22 and the rollers 58, 60, the construction and operation of these rollers are fully disclosed and described in U. S. Patent 2,672,649 and no detailed showing or description are included herein.

The heating unit 16 comprises a rectangular sheet metal box 66, open at the top and provided with a slidable cover 68. The side walls of the box are formed with outturned horizontal flanges 70, while the side margins 72 of the cover are folded down and in to embrace the flanges 70 and be guided by them. An end wall of the box is formed with an upstanding projection 74 for arresting the cover 68 in applied position.

The box 66 has affixed to its lower side an attaching plate 76, through which it is fixedly but removably secured to the base plate or table 10. Upstanding threaded studs 78, fixed on the table or base plate 10, extend upward through openings formed in the attaching plate 76, and have clamping wing nuts 80 threaded onto them. The plate 76 is provided with feet 81, of insulating material, which are secured to the plate 76 by rivets 82a. The screws 78 locate the box 66 exactly in the desired position before the wing nuts 80 are placed on them. The wing nuts 76 are subsequently tightened.

The box 66 is intended, through electrical heating means, to serve as an evaporator for producing steam from water which is supplied by the familiar barometric feed principle from a bottle or jar 82, all as hereinafter described and explained in detail. The box is also designed to have strings of frankfurters passed through it for exposure to the moist heat which is furnished by the steam generated in the box.

The opposite end walls 84 and 86 (Fig. 3) of the box are provided respectively with ovate openings 88 and 90, each a little wider than the diameter of a large frankfurter. The frankfurters enter through the opening 88 in the wall 84 and leave through the opening 90 in the opposite wall 86. A flexible frankfurter guide is interposed between the walls 84 and 86, the guide desirably consisting of a compression coil spring 92 which bears under compression against the walls 84 and 86 in the marginal areas surrounding the openings 88 and 90. The spring is maintained in alignment with the openings by rings 94 and 96 which are affixed to the walls 84 and 86, and which surround the openings 88 and 90, respectively. At the entering end special washers 98 bear against the outer face of the wall 84 in surrounding relation to the opening 88, and an annular, heat insulating mouthpiece 100 of canvas and Bakelite overlies the washers 98. Headed screws 102 are passed outward through the ring 94, the wall 84, and the washers 98, being threaded into the annular mouthpiece 100. The mouthpiece 100, being of heat insulating material, serves to protect the fingers of an operator when a frankfurter string is being introduced through the box 66.

As previously noted, provision is made for supplying evaporating heat electrically to the water in the bottom of the steam box 66. To this end, a heating element 104 of conventional construction and design is provided in the bottom of the steam box. The element 104 includes a conductive metallic wire 106 at the center which is surrounded by ceramic insulating material 108 such as porcelain, and the ceramic material is in turn covered with a shell 110 of metal. The element 104, as shown, consists of a double loop in the bottom of the steam box 66. An angle bracket 112 secured to the walls 86 extends over adjacent portions of the element 104 to hold the element down in place. Supporting pads 114 of insulating material, such as neoprene, are secured to the bottom of the box 66 and provide non-abrading, cushioning, and insulating support for the element 104. The ends of the element 104, in parallel relation, pass snugly through openings in a plate 116 which is affixed to a side wall 117 of the box 66, and thence through a circular opening 118 in the wall 117. A handle 120, in the form of a hollow cup shaped member, is secured to the box by headed screws 122. The screws 122 have their shanks passed through flange portions of the handle 120, and through the box wall 117, and are then threaded into the plate 116. The ends of the wire 106 are hammered flat, bored, and tapped for the reception of screws 126. Each end of the wire 106 is connected through a screw 126 to a conductive clip 128. The clips 128 are securely affixed to the ends of two wires 130 and 132 of a conventional plug-in extension cord 134. The cord 134 passes out of the end of the handle 120 through a flexible rubber grommet 136. Just within the handle 120 a pair of clamping plates 138 and 140 are clamped onto the cord 134 by means of headed screws 142. The clamp protects cord 134 against pulling out of the handle 120 and further protects the heating element 104 against dislodgment or damaging tension.

The bottle 82 is desirably composed of translucent plastic material and is formed with an externally threaded neck 144. A cap 146, also desirably of plastic material, is threaded onto the bottle neck. A hollow stem 148 extends through the cap and protrudes considerably beyond the cap. The stem 148 has affixed upon its inner end a flanged sleeve 150. A collar 152 surrounds the sleeve 150 and is made unitary with it. The flange of the sleeve 150 bears against the mouth of the bottle, and is drawn up firmly to form a sealed joint with the mouth of the bottle as the cap 146 is screwed onto the bottle neck 144. The box cover 68 has exteriorly affixed to it a block 154, composed of canvas and Bakelite, which is provided with a lining sleeve 156, desirably of brass.

When the cover 68 has been applied to the box 66, and the machine is otherwise ready to put into operation, the water filled bottle is inverted, and the stem 148 is inserted through the sleeve 156 with its lower end extending into proximity to the bottom of the box 66 as illustrated in Figure 4. The water feeds down until it has accumulated in the bottom of the box to a sufficient depth to cover the lower end of the stem, at which depth it partially submerges the heating element 104. As the water becomes depleted by evaporation, more water flows down the stem and into the box in accordance with the familiar barometric feed principle. The water does not become depleted rapidly because very little steam escapes from the box either in vapor or liquid form.

When it is desired to clean the entire machine the cord 134 is unplugged, and the machine is wheeled away on its casters for cleaning. When it is desired merely to clean the interior of the box 66, the bottle 82 is first removed, withdrawing the stem 148 with it. This leaves the cover 68 free to be withdrawn, and withdrawal of the cover exposes the interior of the box fully for cleaning or other servicing. The box 66 can also be readily removed from the machine, with or without prior removal of the bottle 82 from the box cover. The cord 134 is first unplugged, and the wing nuts 80 are then backed off of the threaded studs 78.

It is important, as has been noted, that substantial heating of the meat be avoided. The fact that the frankfurters are fed automatically through the steam box at a substantial speed insures a substantially uniform limitation of the heating. An experienced operator can readily effect satisfactory control of the timing of the first one or two frankfurters which pass through before the rollers take effect upon the string. While the beneficial action of the steam box is not fully understood, it is probable that it depends upon the joint action of heat and moisture. The steam applied to the frankfurter casing is fully saturated steam, and since cellophane is hydroscopic to a marked degree and may be stretched before tearing when wet, it is probable that an important function of the steam is to induce the rapid and uniform absorption of moisture by the cellophane.

The box 66 and other metallic parts which are exposed to contact with water and/or steam are desirably composed of non-rustable metal, such as stainless steel, for example.

We have described what we believe to be the best embodiments of our invention. We do not wish, however, to be confined to the embodiments shown, but what we desire to cover by Letters Patent is set forth in the appended claims.

We claim:

1. A frankfurter peeling apparatus comprising means for feeding a string of frankfurters, frankfurter casing severing and peeling means positioned along said feeding means, and steaming means mounted along said feeding means forwardly of said severing and peeling means for steaming the casings of the frankfurters enroute to the severing and peeling means without substantially raising the temperature of the frankfurter meat contained within the casings, said steaming means including a steam box mounted along said feeding means, said steam box having admission and discharge openings in opposite walls of said box, supporting means mounted in said box to support a string of frankfurters passing therethrough from the admission opening to the discharge opening, the bottom of said box being formed to constitute a container for liquid produced by the condensation of steam in said box, and heating means adjacent the bottom of said box for converting condensed liquid to steam for causing the steam to be re-circulated within said steam box, whereby the frankfurters are briefly steamed as they pass through the box.

2. An apparatus for steaming frankfurters continuously fed therethrough to a peeling mechanism by a conveyor, comprising a steam box having admission and discharge openings in opposite walls thereof at a given distance above the bottom of said box, said box being substantially closed except for said admission and discharge openings, frankfurter guide means mounted in said box between said opposite walls for defining an open path from the admission opening to the discharge opening of the box, water supply means including a water container mounted on said box and in communication with the interior thereof for supplying water to the box as the water in the box becomes depleted through evaporation, an electric heater at the bottom of said box below said frankfurter guide means for converting into steam water which accumulates at the bottom of the box due to condensation of the steam within the box, thereby producing a re-circulation of steam within the box, and means on said box for fastening it to the conveyor.

3. An apparatus according to claim 2, wherein the frankfurter guide means consists of a compression coil spring disposed to bear against opposite walls of the box.

4. An apparatus according to claim 2, wherein said box includes a cover and said water supply means comprises a bottle, means mounting said bottle on said cover in an inverted position and a removable cap on said bottle including a long stem which passes downwardly through the cover and into proximity to the bottom of the box.

5. An apparatus according to claim 1 wherein said steaming means includes an electrical heating element in the lower portion of said box, and a barometric feeder for supplying water to the box as the water in the box becomes depleted through evaporation.

6. An apparatus as set forth in claim 5, wherein said supporting means includes a flexible frankfurter guide which defines a continuously open path from the admission opening to the discharge opening of the box, the guide consisting of a compression coil spring disposed to bear against opposite ends of the box.

References Cited in the file of this patent

UNITED STATES PATENTS

| | | |
|---|---|---|
| 887,628 | Hall | May 12, 1908 |
| 1,389,241 | Clefton | Aug. 30, 1921 |
| 2,562,723 | Keller | July 31, 1951 |
| 2,623,237 | Schaller | Dec. 30, 1952 |
| 2,644,982 | Schneider | July 14, 1953 |
| 2,672,646 | Demarest et al. | Mar. 23, 1954 |
| 2,672,649 | Demarest et al. | Mar. 23, 1954 |
| 2,676,632 | Hook et al. | Apr. 27, 1954 |
| 2,702,404 | Rufenach | Feb. 22, 1955 |

FOREIGN PATENTS

| | | |
|---|---|---|
| 146,775 | Germany | Dec. 31, 1903 |